United States Patent [19]

Kim

[11] Patent Number: 5,483,286
[45] Date of Patent: Jan. 9, 1996

[54] MOTION COMPENSATING APPARATUS

[75] Inventor: Seong I. Kim, Seoul, Rep. of Korea

[73] Assignee: Goldstar Co., Ltd., Seoul, Rep. of Korea

[21] Appl. No.: 95,396

[22] Filed: Jul. 21, 1993

[30] Foreign Application Priority Data

Jul. 23, 1992 [KR] Rep. of Korea ............... 1992-13198

[51] Int. Cl.⁶ ........................................... H04N 7/50
[52] U.S. Cl. .................................. 348/402; 348/699
[58] Field of Search ............................. 348/401, 402, 348/413, 416, 699, 574; H04N 7/137

[56] References Cited

U.S. PATENT DOCUMENTS

| | | | |
|---|---|---|---|
| 4,218,703 | 8/1980 | Netravali et al. | 348/416 |
| 4,661,849 | 4/1987 | Hinman | 348/416 |
| 4,723,161 | 2/1988 | Koga | 348/402 |
| 4,816,906 | 3/1989 | Kummerfeldt et al. | 348/402 |
| 5,040,062 | 8/1991 | Knauer et al. | 348/402 |
| 5,128,756 | 7/1992 | Johnston et al. | |
| 5,134,475 | 7/1992 | Johnston et al. | |
| 5,134,477 | 7/1992 | Knauer et al. | |

Primary Examiner—Tommy P. Chin
Assistant Examiner—Richard Lee
Attorney, Agent, or Firm—Fliesler, Dubb, Meyer & Lovejoy

[57] ABSTRACT

A motion compensating apparatus comprising an encoding circuit for compressing and transmitting a video signal of a DFD frame which is a difference between a video signal of a present frame and a motion compensated video signal, a motion compensating circuit for restoring a quantized video signal from the encoding circuit, estimating a motion of the video signal of the present frame in the unit of block on the basis of the restored video signal to obtain a motion vector based on the estimated motion and compensating for a video signal of a reference frame on the basis of the obtained motion vector, a DF scaling factor generating circuit for varying a DF scaling factor properly about 1 when the DF scaling factor is varied according to an output state of the encoding circuit, and a multiplying circuit for multiplying the motion compensated video signal from the motion compensating circuit by the DF scaling factor from the DF scaling factor generating circuit. The original video signal can be restored even in the case where the data is subjected to a loss due to a channel error or a channel change.

4 Claims, 5 Drawing Sheets

MOTION COMPENSATING APPARATUS

BACKGROUND OF THE INVENTION

1. Field of the Invention

The present invention relates in general to video signal processing systems in which an input video signal is compressed for transmission and the compressed video signal is restored to be displayed on a screen, and more particularly to a motion compensating apparatus which is capable of restoring a video signal even when a channel change or a channel error is generated.

2. Description of the Prior Art

Figure 1:
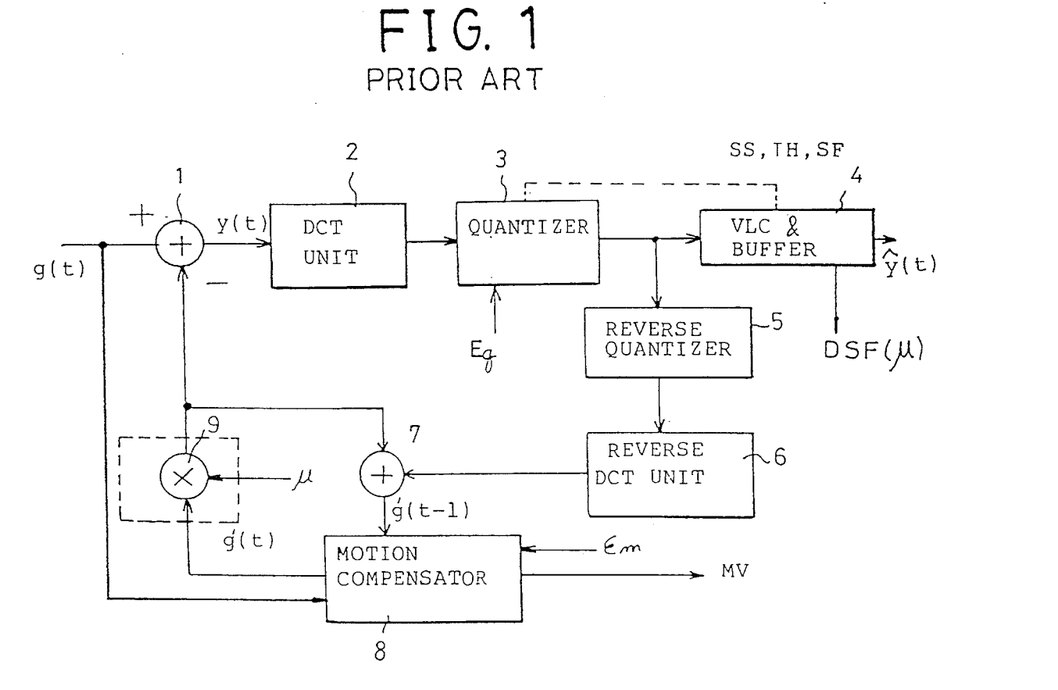
FIG. 1 is a block diagram of a conventional motion compensating apparatus.

Referring to FIG. 1, there is shown a block diagram of a conventional motion compensating apparatus. As shown in this drawing, the conventional motion compensating apparatus comprises an adder 1 for adding a multiplied signal μg'(t) to a video signal g(t) of a present frame to output a video signal y(t) of a displaced frame difference (DFD) frame which is a difference between the video signal g(t) of the present frame and a motion compensated video signal g'(t), a discrete cosine transform (DCT) unit 2 for transforming a time domain of the video signal y(t) of the DFD frame from the adder 1 into a frequency domain, a quantizer 3 for quantizing an output signal from the DCT unit 2, and a variable length coder (VLC)/buffer 4 for compressing video signal blocks from the quantizer 3 by different lengths according to a probability that the video signal blocks occur and outputting a step size SS, a threshold TH, a scaling factor SF and a DF scaling factor DSF according to statistical properties of an input video signal.

The conventional motion compensating apparatus also comprises a reverse quantizer 5 for quantizing reversely an output signal from the quantizer 3, a reverse DCT unit 6 for transforming a frequency domain of an output signal from the reverse quantizer 5 into a time domain, an adder 7 for adding the multiplied signal μg'(t) to an output signal from the reverse DCT unit 6 to output a video signal g'(t−1) of a previous frame, a motion compensator 8 for calculating a motion vector MV from the video signal g'(t−1) of the previous frame from the adder 7 and outputting the motion compensated video signal g'(t) based on the calculated motion vector MV, and a multiplier 9 for multiplying the motion compensated video signal g'(t) from the motion compensator 8 by the DF scaling factor DSF (μ) to output the multiplied signal μ g'(t).

Here, the reference numerals εq and εm, not described, designate an error generated in the quantizer 3 and an estimated motion error, respectively.

The operation of the conventional motion compensating apparatus with the above-mentioned construction will hereinafter be described.

To be brief, the video signal of the previous frame is partitioned into blocks, and it is then estimated that each block is moved to any one of blocks of the video signal of the present frame. The estimated motion is expressed as a vector. In result, the original video signal is restored by using the motion vector MV and the video signal y(t) of the DFD frame which is the difference between the video signal g(t) of the present frame and the motion compensated video signal g'(t).

In detail, upon inputting the video signal g(t) of the present frame, the motion compensator 8 calculates a difference between the inputted video signal of the present frame g(t) and the video signal g'(t−1) of the previous frame stored therein and compensates for the video signal g'(t−1) of the previous frame by the calculated difference. As a result of the compensation, the motion compensator 8 outputs the video signal g'(t) analogous to the video signal g(t) of the present frame to the multiplier 9.

The adder 1 obtains the video signal y(t) of the DFD frame which is the difference between the video signal g(t) of the present frame and the video signal g'(t) analogous thereto. This video signal y(t) of the DFD frame from the adder 1 is transmitted through the DCT unit 2, the quantizer 3 and the variable length coder/buffer 4. On the basis of the motion vector and the statistical properties of the video signal of the DFD frame, the variable length coder/buffer 4 outputs the step size SS, the threshold TH and the scaling factor SF to control the quantizer 3. Also, the variable length coder/buffer 4 outputs the DF scaling factor DSF to reduce an error component being generated in performing the motion compensation to the minimum.

On the other hand, the video signal of the DFD frame quantized by the quantizer 3 is reversely quantized by the reverse quantizer 5 and the frequency domain thereof is transformed into the time domain by the reverse DCT unit 6. The video signal of the DFD frame from the reverse DCT unit 6 is applied to the motion compensator 8. On the basis of the video signal of the DFD frame, the motion compensator 8 compensates again for the motion compensated video signal g'(t) analogous to the video signal of the present frame and then stores the motion re-compensated video signal as a video signal of a reference frame therein.

Thereafter, upon inputting the video signal g(t) of the present frame, the motion compensator 8 calculates a difference between the inputted video signal of the present frame g(t) and the video signal g'(t−1) of the previous frame stored therein and compensates for the video signal g'(t−1) of the previous frame by the calculated difference. As a result of the compensation, the motion compensator 8 outputs the video signal g'(t) analogous to the video signal g(t) of the present frame to the multiplier 9.

The multiplier 9 multiplies the motion compensated video signal g'(t) from the motion compensator 8 by the DF scaling factor DSF (μ) and outputs the multiplied signal μg'(t) to the adder 1, which obtains the video signal y(t) of the DFD frame which is the difference between the video Signal g(t) of the present frame and the video signal μg'(t) analogous thereto. This video signal y(t) of the DFD frame from the adder 1 is frequency domain-transformed and quantized by the DCT unit 2 and the quantizer 3, respectively. The quantized video signal y(t) is compressed for transmission by the variable length coder/buffer 4.

On the other hand, the video signal of the DFD frame quantized by the quantizer 3 is reversely quantized by the reverse quantizer 5 and the frequency domain thereof is transformed into the time domain by the reverse DCT unit 6. The video signal of the DFD frame from the reverse DCT unit 6 is applied to the motion compensator 8, which compensates again for the motion compensated video signal g'(t) analogous to the video signal of the present frame on the basis of the video signal of the DFD frame and then stores the motion recompensated video signal as the video signal of the reference frame therein.

In the motion compensator 8, the video signal of the previous frame is partitioned into blocks, and it is then estimated that each block is moved to any one of blocks of the video signal g(t) of the present frame. The motion of the blocks of the video signal of the previous frame is compensated for on the basis of the estimated motion vector MV. At this time, the motion vector MV is compressed for transmission, and the motion compensated video signal g'(t)

analogous to the video signal of the present frame is stored in the motion compensator 8 and also applied to the multiplier 9, which multiplies the applied motion compensated video signal g'(t) by the DF scaling factor DSF (μ) and outputs the multiplied signal μg'(t) to the adder 1.

Obtained in the adder 1 is the video signal y(t) of the DFD frame which is the difference between the video signal μg'(t) of the present frame and the video signal g'(t) the motion of which was compensated for on the basis of the video signal of the present frame. This video signal y(t) of the DFD frame from the adder 1 is compressed for transmission by the DCT unit 2, the quantizer 3 and the variable length codes/buffer 4. Namely, there is transmitted the video signal of the DFD frame which is the difference between the video signal μg'(t) of the present frame and the video signal g'(t) which is analogous to the video signal of the present frame and the motion thereof was compensated for by the motion compensator 8. Therefore, the original video signal is restored on the basis of the video signal of the reference frame and the motion vector MV from the motion compensator 8 and the video signal y(t) of the DFD frame from the adder 1.

In the conventional motion compensating apparatus, however, in the case where the video signal of the reference frame stored in the motion compensator is subjected to a loss due to a channel error, the original video signal can be restored to a certain degree on the basis of the multiplied signal, but a good long time is required in restoring the original video signal because of a linearity of the scaling factor of the multiplied signal, particularly when a great number of errors are generated in the motion compensation. Also, the video signal of the reference frame is forced to be refreshed at predetermined time intervals. This results in an increase in the time being required in compensating for the motion.

SUMMARY OF THE INVENTION

Therefore, the present invention has been made in view of the above problems, and it is an object of the present invention to provide a motion compensating apparatus which is capable of restoring a video signal even in the case where a motion vector is subjected to a loss, by varying a DF scaling factor adaptively according to a video signal of a DFD frame.

In accordance with the present invention, the above and other objects can be accomplished by the provision of a motion compensating apparatus comprising: encoding means for compressing and transmitting a difference signal between a video signal of an inputted present frame and a motion compensated video signal and also outputting a difference frame ("DF") scaling factor the value of which varies according to an output buffer state of said encoding means; motion compensating means for restoring a quantized video signal from said encoding means, estimating a motion of the video signal of the present frame in the unit of blocks thereof on the basis of the restored video signal to obtain a motion vector based on the estimated motion and motion-compensating a video signal of a reference frame on the basis of the obtained motion vector; DF scaling factor generating means for adaptively changing the value of the DF scaling factor output from said encoding means so as to center the value of the DF scaling factor around 1 as the value of the DF scaling factor is varied in accordance with the buffer output state of the encoding means; and multiplying means for multiplying the motion compensated video signal from said motion compensating means by the DF scaling factor from said DF scaling factor generating means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 2:
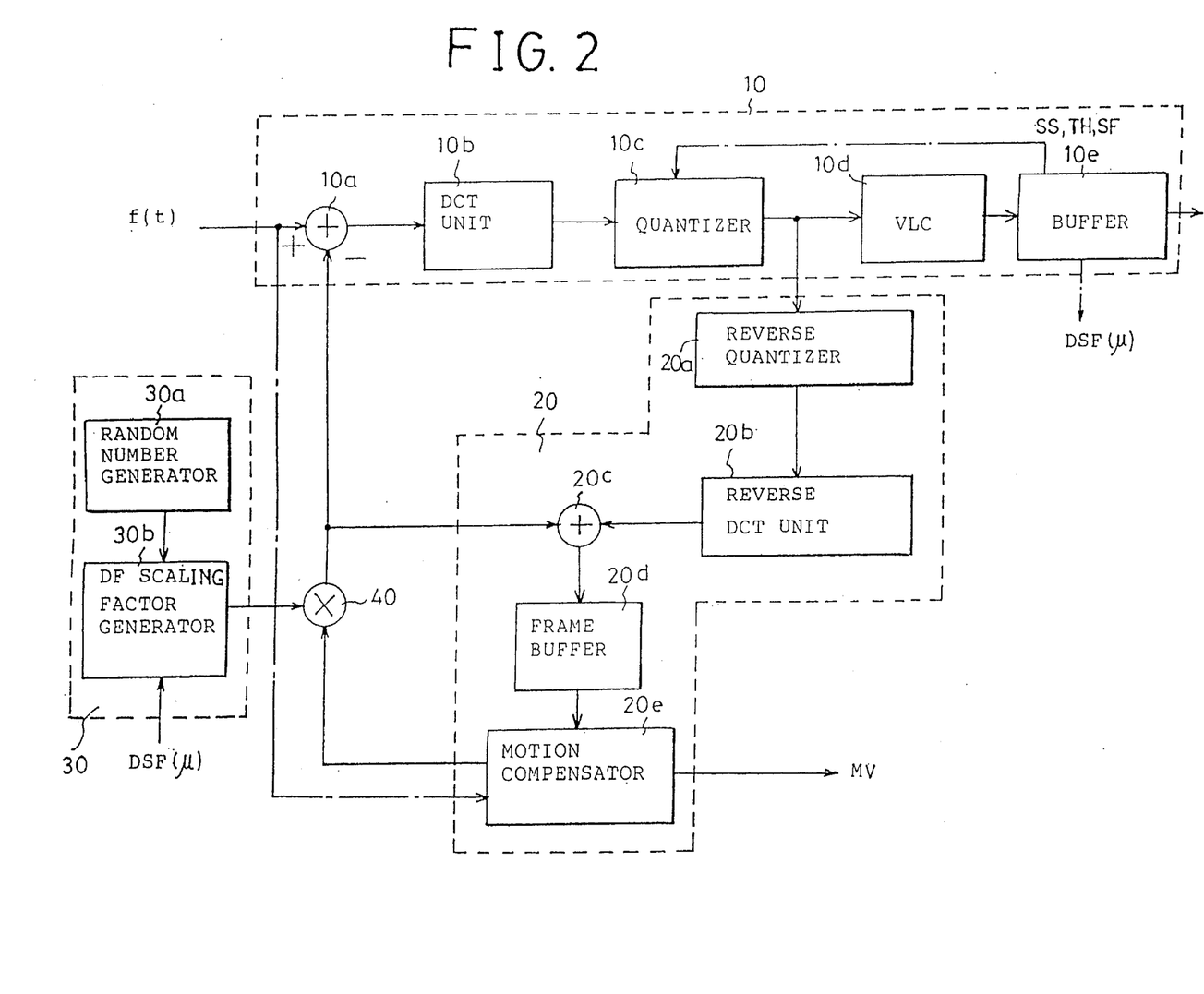
FIG. 2 is a block diagram of a motion compensating apparatus in accordance with an embodiment of the present invention.

Referring to FIG. 2, there is shown a block diagram of a motion compensating apparatus in accordance with an embodiment of the present invention. As shown in this drawing, the motion compensating apparatus of the present invention comprises an encoding circuit 10 for compressing and transmitting a video signal of a DFD frame which is a difference between a video signal of a present frame and a motion compensated video signal and also outputting a difference frame ("DF") scaling factor μ the value of which varies according to the state of an output buffer of the encoding circuit 10, a motion compensating circuit 20 for restoring a quantized video signal from the encoding circuit 10, estimating a motion of the video signal of the present frame in the unit of blocks thereof on the basis of the restored video signal to obtain a motion vector based on the estimated motion and compensating for a video signal of a reference frame on the basis of the obtained motion vector, a DF scaling factor generating circuit 30 for adaptively changing the value of the DF scaling factor (μ) to be centered around 1 as the DF scaling factor μ output by the encoding circuit is varied according to an output buffer state of the encoding circuit 10, and a multiplier 40 for multiplying the motion compensated video signal from the motion compensating circuit 20 by the DF scaling factor μ from the DF scaling factor generating circuit 30.

Here, the encoding circuit 10 includes an adder 10a, a DCT unit 10b, a quantizer 10c, a variable length coder (VLC) 10d and a buffer 10e. The motion compensating circuit 20 includes a reverse quantizer 20a, a reverse DCT unit 20b, an adder 20c, a frame buffer 20d and a motion compensator 20e. The DF scaling factor generating circuit 30 includes a random number generator 30a and a DF scaling factor generator 30b.

Figure 3:
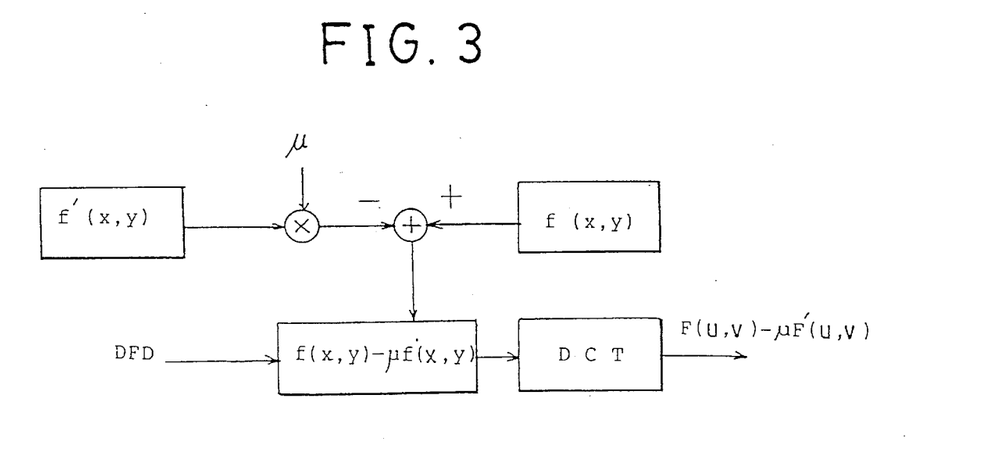
FIG. 3 is a block diagram illustrating a relationship between a multiplied signal from a multiplier and a video signal of a present frame in accordance with the embodiment of the present invention.
Figure 4:
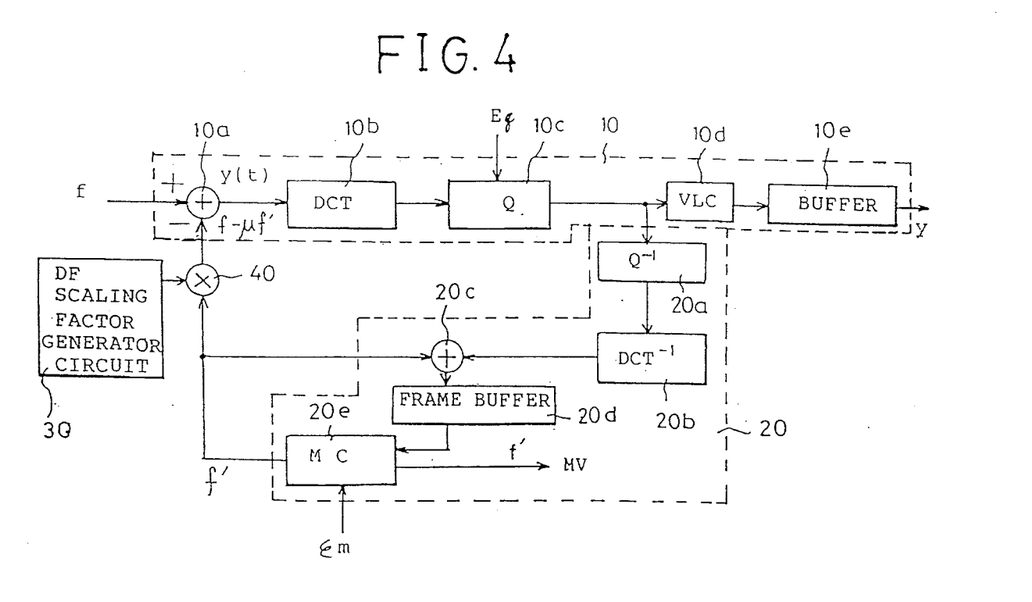
FIG. 4 is a block diagram illustrating an operation of restoring an encoded video signal in accordance with the embodiment of the present invention.
Figure 5:
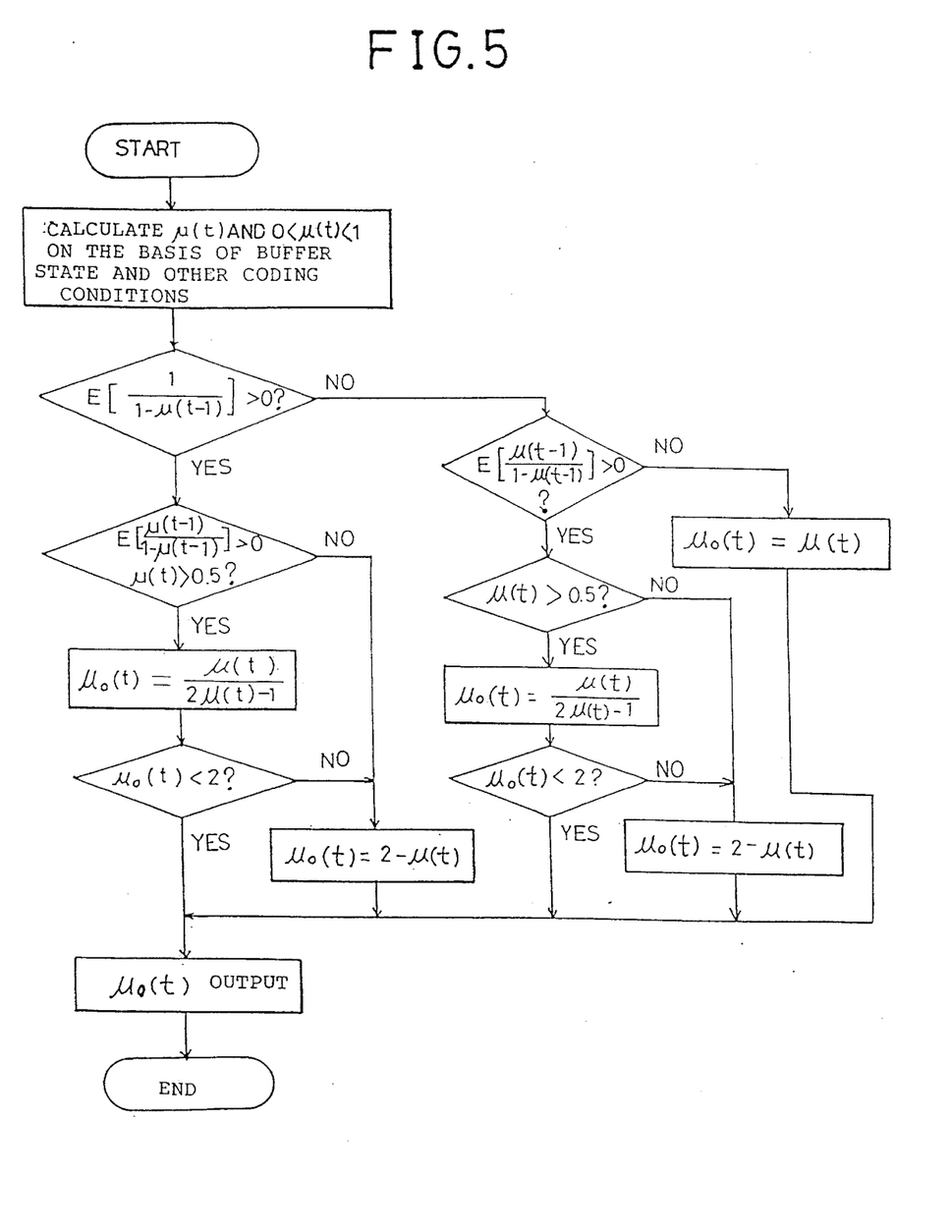
FIG. 5 is a flowchart illustrating an operation of generating a DF scaling factor in accordance with the embodiment of the present invention.

The operation of the motion compensating apparatus with the above-mentioned construction in accordance with the present invention will hereinafter be described in detail with reference to FIGS. 3 to 5.

The difference signal between an inputted video signal of the present frame and the motion compensated video signal is compressed and transmitted by the DCT unit 10b, the quantizer 10c, the variable length coder 10d and the buffer 10e. Also, the video signal from the quantizer 10c is restored to its original state by the reverse quantizer 20a and the reverse DCT unit 20b and then stored into the frame buffer 20d through the adder 20c.

The buffer 10e is adapted to output a step size SS, a threshold TH and a scaling factor SF to control the quantizer 10c and the DF scaling factor DSF μ the value of which is varied in accordance with the output buffer state to control the quantizer 10c.

Thereafter, a video signal of a previous frame stored in the frame buffer 20d is applied to the motion compensator 20e, which partitions the applied video signal of the previous frame into blocks, estimates the motion of blocks of the video signal of the present frame on the basis of the partitioned blocks and obtains the motion vector based on the estimated video block motion.

The motion vector from the motion compensator 20e is compressed and transmitted by the variable length coder 10d in the encoding circuit 10. Also, the motion compensator 20e moves blocks of the video signal of the reference frame stored in the frame buffer 20d to output the motion compensated video signal of the reference frame.

On the other hand, the DF scaling factor μ is varied according to the output state of the buffer 10e in the encoding circuit 10. For this reason, in the DF scaling factor generating circuit 30, the random number generator 30a is adapted to substitute random values for the varied DF scaling factor μ in the expressions $1/(1-\mu)$ and $\mu/(1-\mu)$, so as to allow the averages of $1/(1-\mu)$ and $\mu/(1-\mu)$ to become 0 and generate the resultant substitute DF scaling factor $\mu_o$. Also, the DF scaling factor generator 30b adaptively changes the value of the resultant substitute DF scaling factor $\mu_o$ from the random number generator 30a to be centered around 1.

The operation of generating the DF scaling factor μ will hereinafter be described in detail with reference to FIG. 5.

The DF scaling factor μ(t−1) which is generated on the video signal of the previous frame according to the output state of the buffer 10e is substituted for μ in the expression $1/(1-\mu)$ and the average $E(1/(1-\mu))$ is calculated. Then, it is checked whether the average $E(1/(1-\mu))$ is greater than 0. Also, the DF scaling factor μ(t−1) is substituted for μ in the expression $\mu/(1-\mu)$ and the average $E(\mu/(1-\mu))$ is calculated. Then, it is checked whether the average $E(\mu/(1-\mu))$ is greater than 0.

If it is checked that both of the two averages $E(1/(1-\mu))$ and $E(\mu/(1-\mu))$ are greater than 0 and if the DF scaling factor μ(t) generated on the video signal of the present frame is greater than 0.5, the DF scaling factor μ(t) generated on the video signal of the present frame is substituted for μ in the expression $\mu/2\mu-1$. If the calculated $\mu/(2-\mu-1)$ is smaller than 2, the DF scaling factor μ(t) generated on the video signal of the present frame is directly outputted as the DF scaling factor $\mu_o(t)$ to the multiplier 40.

If it is checked that both of the two averages $E(1/(1-\mu))$ and $E(\mu/(1-\mu))$ are greater than 0 but if the DF scaling factor μ(t) generated on the video signal of the present frame is smaller than 0.5 or the calculated values of $\mu/(2-\mu)$, in which μ is substituted by the DF scaling factor μ(t) generated on the video signal of the present frame, is greater than or equal to 2, the DF scaling factor generator 30b subtracts from 2 the DF scaling factor μ(t) generated on the video signal of the present frame and outputs the resultant value as the DF scaling factor $\mu_o(t)$ to the multiplier 40.

Also, if it is checked that the average $E1/(1-\mu)$ is smaller than or equal to 0 and the average $E(\mu/(1-\mu))$ is greater than 0 and if the DF scaling factor μ(t) generated on the video signal of the present frame is greater than 0.5, the DF scaling factor μ(t) generated on the video signal of the present frame is substituted for in the expression $\mu/2\mu-1$. If the calculated value of $\mu/2\mu-1$ is smaller than 2, the DF scaling factor μ(t) generated on the video signal of the present frame is directly outputted as the DF scaling factor $\mu_o(t)$ to the multiplier 40.

On the other hand, if it is checked that neither of the two averages $E(1/(1-\mu))$ and $E(\mu/(1-\mu))$ are less than 0, the DF scaling factor μ(t) generated on the video signal of the present frame is directly outputted as the DF scaling factor $\mu_o(t)$ to the multiplier 40.

The DF scaling factor $\mu_o(t)$ which is generated in this manner in the DF scaling factor generating circuit 30 is multiplied by the motion compensated video signal of the reference frame in the multiplier 40 and the resultant multiplied signal is then applied to the adder 10a in the encoding circuit 10. As a result, the adder 10a outputs the video signal y(t) of the DFD frame which is the difference between the video signal of the present frame and the multiplied motion compensated video signal of the reference frame.

The video signal y(t) of the DFD frame from the adder 10a in the encoding circuit 10 enables the original video signal to be restored to a certain degree in the case where the motion vector is subjected to a loss. In this case, the restoration capability is dependent on the DF scaling factor μ.

Also, the video signal y(t) of the DFD frame from the adder 10a is compressed and transmitted by the DCT unit 10b, the quantizer 10c, the variable length coder 10d and the buffer 10e. Namely, the encoding circuit 10 compresses and transmits the motion vector from the motion compensating circuit 20 and the video signal of the DFD frame.

Now, a relationship between the motion compensated video signal of the reference frame and the video signal of the present frame will be described with reference to FIG. 3.

Assuming that the blocks of the motion compensated video signal of the reference frame are f'(x,y) and the blocks of the video signal of the present frame are f(x,y), the results are $$DCT(f(x,y))=F(u,v),\ DCT(f'(x,y))=F'(u,v),$$

$$DCT(f(x,y))=\mu F'(u,v)\ \text{and}\ F(u,v)=\mu F'(u,v)$$

Assuming that there are no error εm in the motion compensation and no error εq in the quantization, namely, F(u,v)=F'(u,v), the result is $$F(u,v)-\mu F(u,v)=F(u,v)(1-\mu)$$

Namely, when 1−μ approaches to 0, the result approaches the blocks of the video signal of the present frame. Here, μ is the DF scaling factor.

The above operation will hereinafter be described in more detail with reference to FIG. 4.

Assuming that the blocks of the video signal of the present frame are f, the blocks of the motion compensated video signal of the reference frame are f', the error in the quantization is εq, the error in the motion compensation is εm and the blocks of the video signal of the DFD frame are y, the blocks y of the video signal of the DFD frame from the adder 10a in the encoding circuit 10 can be expressed by the following equation (1):

$$f-\mu f'=f-\mu(f+\epsilon q+\epsilon m) \quad (1)$$

Also, the blocks y of the video signal of the DFD frame from the quantizer 10c can be expressed by the following equation (2):

$$\begin{aligned} f-\mu f' &= f-\mu(f+\epsilon q+\epsilon m)+\epsilon q \\ &= (1-\mu)f-(1-\mu)\epsilon q+\mu\epsilon m \end{aligned} \quad (2)$$

The motion vector MV from the motion compensator 20e in the motion compensating circuit 20 can be expressed by the following equation (3):

$$MV=f'+\epsilon q=f+\epsilon q+\epsilon m \quad (3)$$

In the encoding circuit 10, the blocks 7 of the video signal of the DFD frame satisfying the equation (2) and the motion vector MV satisfying the equation (3) are added and compressed and the resultant, compressed signal is transmitted through a channel. The transmitted signal can be expressed by the following equation (4):

$$\begin{aligned} &(1-\mu)f-(1-\mu)\epsilon q+\mu\epsilon m+f+\epsilon q+\epsilon m \\ &= (2-\mu)f-\mu(\epsilon m+\epsilon q)+2\epsilon q+\epsilon m \\ &= (2-\mu)f-(1-\mu)(\epsilon q+\epsilon m)+\epsilon q \end{aligned} \quad (4)$$

As seen from the above equation (4), the original video signal is restored by multiplying the blocks (equation 2) of the quantized video signal of the present frame by a reciprocal $(1/\mu)$ of the DF scaling factor $\mu$ and adding the multiplied signal to the blocks (equation 3) of the motion compensated video signal of the reference frame. Namely, the restored video signal can be expressed by the following equation (5):

$$\begin{aligned} &\text{equation (3)} + \text{equation (2)} \times (1/\mu) \\ &= f+\epsilon q+\epsilon m+(1/\mu)f-(f+\epsilon q+\epsilon m)+(1/\mu)\epsilon q \\ &= (1/\mu)(f+\epsilon q) \end{aligned} \quad (5)$$

Then, the original video signal is restored by multiplying the equation (5) by the DF scaling factor $\mu$.

By the way, in the case where the motion vector MV is not transmitted due to opening of a new channel or a channel breakage, the original video signal can be restored by only the blocks y of the video signal of the DFD frame. Namely, the original video signal is restored based on a signal which is obtained by multiplying the blocks y of the video signal of the DFD frame satisfying the equation (2) by $1/(1-\mu)$.

$$\text{equation (2)}/(1-\mu)= f-(\mu/(1-\mu))\epsilon q+(1/(1-\mu))\epsilon m \quad (6)$$

The DF scaling factor generating circuit 30 generates the DF scaling factor $\mu$ by taking the average of the blocks of the video signal of the DFD frame satisfying the above equation (6) as in the below equation (7) and approaching error components in the taken average to 0.

$$E(y+\epsilon q)=E(f)-E(\mu/(1-\mu))E(\epsilon q)+E(1/(1-\mu))E(\epsilon m) \quad (7)$$

Approaching $E(\mu/(1-\mu))$ and $E(1/(1-\mu))$ in the above equation (7) to 0, the result is $$E(\mu/(1-\mu))E(\epsilon q)+E(1/(1-\mu))E(\epsilon m)=0$$

As a result, the average of the blocks (y+εq) of the video signal of the DFD frame which is transmitted from the encoding circuit 10 satisfies the following equation:

$$E(f)+\epsilon$$

where ε is a white noise.

On the other hand, the original video signal is restored to a certain degree with no motion vector MV in the case where only the video signal of the DFD frame cannot constitute the video signal of the reference frame which is stored in the frame buffer.

Here, a signal to noise ratio (SNR) of the transmitted video signal and the restored video signal is 20 log g/εq when the video signal is perfectly transmitted. In the case where only the video signal (y+εq) of the DFD frame is transmitted, the SNR is $$\begin{aligned} &20 \log Si/So \\ &= 20 \log ((1-\mu)f/(\mu\epsilon m+\epsilon q)) \\ &= 20 \log ((1-\mu)/\mu)(f/\epsilon m+\epsilon q)) \end{aligned}$$

Also, in the case where the channel is at a steady state, the SNR is $$\begin{aligned} &20 \log Si/So \\ &= 20 \log E(f)/(\mu/(1-\mu))E(\epsilon m)+(1/(1-\mu))E(\epsilon q)) \\ &= 20 \log f/\epsilon \end{aligned}$$

where ε is a white noise.

Figure 6:
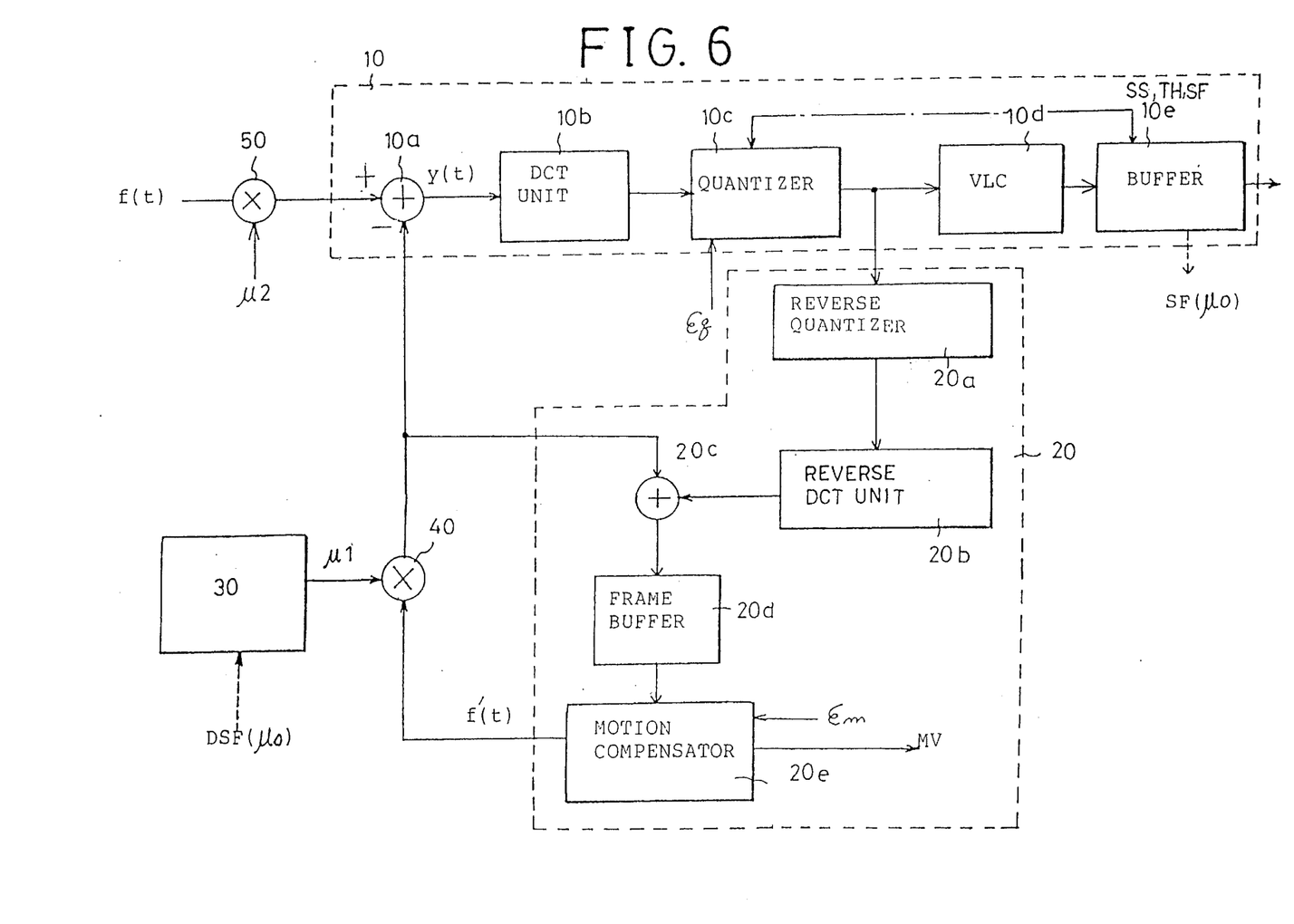
FIG. 6 is a block diagram of a motion compensating apparatus in accordance with an alternative embodiment of the present invention.

Referring to FIG. 6, there is shown a block diagram of a motion compensating apparatus in accordance with an alternative embodiment of the present invention. The construction in this drawing is substantially the same as that in FIG. 2, with the exception that an additional multiplier 50 is connected to the adder 10a in the encoding circuit 10 to multiply the video signal f(t) of the present frame by a DF scaling factor $\mu 2$.

In operation, if the DF scaling factor $\mu 0$ from the buffer 10e in the encoding circuit 10 is greater than 1, the DF scaling factor $\mu 1$ which is generated based on the DF scaling factor $\mu 0$ in the DF scaling factor generating circuit 30 is applied to the multiplier 40. In this case, a ratio ($\mu 2= \mu 1/\mu 0$) of the DF scaling factor $\mu 1$ from the DF scaling factor generating circuit 30 and the DF scaling factor $\mu 0$ from the buffer 10e is applied as the DF scaling factor $\mu 2$ to the multiplier 50. As a result, the original video signal can be restored with no motion vector MV.

Also, if the DF scaling factor $\mu 1$ from the DF scaling factor generating circuit 30 is smaller than or equal to 1, it is applied directly to the multiplier 40 and 1 is applied as the DF scaling factor $\mu 2$ to the multiplier 50.

On the other hand, if the DF scaling factor $\mu 1$ from the DF scaling factor generating circuit 30 is greater than 1, it is set to 1 and then applied to the multiplier 40, and a reciprocal $(1/\mu 1)$ of the DF scaling factor $\mu 1$ is applied as the DF scaling factor $\mu 2$ to the multiplier 50.

In order to restore the video signal perfectly on the basis of the DF scaling factors $\mu 1$ and $\mu 2$ which are applied to the multipliers 40 and 50, respectively, in the above manner, the average $E(1/(1-\mu 1(t)))$ of the DF scaling factor $\mu 1(t)$ is approached to 0 and the result is $$\mu 1(t)=2-\mu 1(t-1)$$

The DF scaling factor $\mu 1(t)$ satisfying the above equation is greater than 0 and smaller than 1 or greater than 1 and smaller than 2.

Also, approaching the average $E(\mu 1(t)/(1-\mu 1(t)))$ of the DF scaling factor $\mu 1(t)$ to 0, the result is $$\mu 1(t)=\mu 1(t)/(2\mu 1(t)-1)$$

The DF scaling factor µ1(t) satisfying the above equation is greater than 0.5 and smaller than 1 or greater than 0 and smaller than 1.

Subsequently, the DF scaling factor µ1(t) satisfying both the above conditions is greater than 0.5 and smaller than 1 or greater than 1 and smaller than 2.

The DF scaling factor in this embodiment is appropriately changed in value so as to be centered around about 1 in the same manner as that in the first embodiment.

As hereinbefore described, according to the present invention, the DF scaling factor is generated adaptively according to the video signal of the DFD frame so that the video signal can be restored perfectly or to a certain degree even with no motion vector. The perfect restoration of the video signal results in a reduction in the time required in refreshing the video signal of the reference frame which is stored in the frame buffer. Also, since the video signal can be restored to a certain degree even with no motion vector, there can be prevented the spread of the errors due to the data loss.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A motion compensating apparatus comprising:

encoding means for transforming, quantizing, compressing and transmitting a difference frame signal representative of a difference between a video signal of a present input frame and a motion compensated video signal of a reference frame, said encoding means outputting a displaced frame (DF) scaling factor µ having a value which varies according to an output buffer state of said encoding means;

motion compensating means for restoring the transformed and quantized video signal from said encoding means, estimating a motion of the video signal of the present input frame in units of blocks their on the basis of the restored video signal to obtain a motion vector based on the estimated motion and compensating a video signal of the reference frame on the basis of the obtained motion vector;

displaced frame (DF) scaling factor generating means for adaptively changing the value of the DF scaling factor µ to generate a first DF sealing factor centered around 1 as the DF scaling factor µ is varied according to the output buffer state of said encoding means, and wherein said DF scaling factor generating means includes:

random number generator for substituting the values for the DF scaling factor µ from said encoding means so as to approach the averages of $1/1-\mu$ and $\mu/1-\mu$ to 0 and generating a resultant DF scaling factor in accordance therewith; and DF scaling factor generator means for centering the value of the DF scaling factor from said random number generator means around 1 and outputting the first DF scaling factor in accordance therewith;

first multiplying means for multiplying the motion compensated video signal from said motion compensating means by the first DF scaling factor from said DF scaling factor generating means, and adding means for differencing the video signal of the present input frame with the multiplied motion compensated video signal from aid first multiplying means to obtain said difference frame signal.

2. A motion compensating apparatus as set forth in claim 1, further comprising:

second multiplying means provided at an input of said adding means for multiplying the video signal of the present input frame by a second DF scaling factor from said DF scaling factor generating means and wherein when a value of the DF scaling factor from said encoding means is greater than 1, the value of said second DF scaling factor is made equal to the ratio between a value of the fast DF scaling factor from said sealing factor generating means and the value of said DF scaling factor from said encoding means, and when the value of said DF scaling factor from said encoding means, and when the value of said first DF scaling factor from said DF scaling factor generating means is less than or equal to 1 the value of said second DF scaling factor is made equal to 1, and when the value of said second DF scaling factor is made equal to 1, and when the value of said first DF scaling factor from said DF scaling factor generating means is greater than 1 the value of said second DF scaling factor is made equal to the recipe of said first DF scaling factor.

3. A motion compensating apparatus for processing data in frames including a present frame and a previous frame comprising:

encoding means for processing a video signal of the present frame and a scaled motion compensated video signal of the previous frame to form processed signals and for encoding the processed signals to form a displaced frame scaling factor, motion compensating means receiving the processed signals and the sealed motion compensated video signals for forming motion compensated signals, scaling factor generating means for processing the displaced frame scaling factor to generate a resultant scaling factor $\mu_o(t)$ having a controlled value .wherein said scaling factor generating means operates to process the displaced frame scaling factors to form processed values, compare the processed values with reference values to form comparison results, modify the displaced frame scaling factor for the present frame to form a modified displaced frame scaling factor, select, as a function of the comparison results, the modified displaced frame scaling factor or select the displaced frame scaling factor for the present frame as the resultant displaced frame scaling factor; and multiplying means for multiplying the motion compensated video signal from said motion compensating means by the resultant scaling factor $\mu_o(t)$ from said scaling factor generating means to form said scaled motion compensated video signal.

4. A motion compensating apparatus for processing data in frames including a present frame at time (t) and a previous frame at time (t−1) comprising:

encoding means for processing a video signal of the present frame and a scaled motion compensated video signal of the previous frame to form processed signals and for encoding the processed signals to form displaced frame scaling factors;

motion compensating means receiving the processed signals and the scaled motion compensated video signals for forming motion compensated signals, scaling factor generating means for processing a displaced frame scaling factor $\mu(t)$ for the present frame and a displaced frame scaling factor $\mu(t-1)$ for the previous frame to generate a resultant displaced scaling factor $\mu_o(t)$, wherein said scaling factor generating means operates to process $\mu(t-1)$ to form a first processed value determined by $1/\{1-\mu(t-1)\}$ and a second processed value determined by $\mu(t-1)/\{1-\mu(t-1)\}$, compare the first processed value with a reference value of 0,    if the first processed value is greater than 0, then compare the second processed value with a reference value of 0, if the second processed value is greater than 0 and $\mu(t)$ is greater than 0.5, then,    process $\mu(t)$ to form a third processed value determined by $\mu(t)/\{2\mu(t)-1\}$ and if the third processed value is less than 2 output the third processed value as the resultant displaced frame scaling factor $\mu_o(t)$ and otherwise subtract $\mu(t)$ from 2 to provide $2-\mu(t)$ as the resultant displaced frame scaling factor $\mu_o(t)$,    if the second processed value is not greater than 0 or $\mu(t)$ is not greater than 0.5 then, subtract $\mu(t)$ from 2 to provide $2-\mu(t)$ as the resultant displaced frame scaling factor $\mu_o(t)$, if the first processed value is not greater than 0, then compare the second processed value with a reference value of 0,    if the second processed value is greater than 0, then      if $\mu(t)$ is greater than 0.5, then    process $\mu(t)$ to form the third processed value determined by $\mu(t)/\{2\mu(t)-1\}$ and if the third processed value is less than 2, output the third processed value as the resultant displaced frame scaling factor $\mu_o(t)$ and otherwise subtract $\mu(t)$ from 2 to provide $2-\mu(t)$ as the resultant displaced frame scaling factor $\mu_o(t)$,      if $\mu(t)$ is not greater than 0.5, then subtract $\mu(t)$ from 2 to provide $2-\mu(t)$ as the resultant displaced frame scaling factor $\mu_o(t)$,    if the second processed value is not greater than 0, then provide $\mu(t)$ as the resultant displaced frame scaling factor $\mu_o(t)$;

multiplying means for multiplying the motion compensated video signal from said motion compensating means by the resultant scaling factor $\mu_o(t)$ from said scaling factor generating means to form said scaled motion compensated video signal.

* * * * *